US008714647B2

(12) United States Patent
Westerink et al.

(10) Patent No.: US 8,714,647 B2
(45) Date of Patent: May 6, 2014

(54) PASSENGER SEAT ASSEMBLY

(75) Inventors: Rik Westerink, Corinth, TX (US);
Jeffrey P. Wegenka, Denton, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 576 days.

(21) Appl. No.: 12/957,794

(22) Filed: Dec. 1, 2010

(65) Prior Publication Data
US 2011/0148167 A1 Jun. 23, 2011

Related U.S. Application Data

(60) Provisional application No. 61/283,230, filed on Dec. 1, 2009.

(51) Int. Cl.
*B60N 2/22* (2006.01)
*B60N 2/64* (2006.01)

(52) U.S. Cl.
USPC ............................ 297/354.11; 297/362.13

(58) Field of Classification Search
USPC ...................... 297/362.13, 354.11
See application file for complete search history.

(56) References Cited

U.S. PATENT DOCUMENTS 6,669,295 B2 * 12/2003 Williamson ............ 297/362.13
6,776,457 B2 * 8/2004 Muin et al. ........... 297/362.13 X
7,716,797 B2 * 5/2010 Kismarton et al. ...... 297/452.18
7,726,607 B2 * 6/2010 Schumacher et al. ... 297/362.13
7,926,873 B2 * 4/2011 Rombouts ................ 297/335 X

FOREIGN PATENT DOCUMENTS

| DE | 1901045 | 8/1969 | |
|---|---|---|---|
| DE | 19724763 | 12/1998 | |
| EP | 1048510 | 11/2000 | |
| FR | 2602133 | 2/1988 | |
| GB | 1189942 | 4/1970 | |
| WO | WO 2008143249 A1 * | 11/2008 | ........... 297/354.11 X |

OTHER PUBLICATIONS

International Preliminary Report on Patentability dated Jun. 14, 2012 in Application No. PCT/US2010/058495.
International Search Report and Written Opinion dated Sep. 15, 2011 in Application No. PCT/US2010/058495.
SICMA AERO SEAT, Part No. List, B737-800 Austrian Airlines, one page, dated Mar. 12, 2004.

(Continued)

*Primary Examiner* — Anthony D Barfield
(74) *Attorney, Agent, or Firm* — Kilpatrick Townsend & Stockton LLP; Tiffany L. Williams, Esq.; Dean W. Russell, Esq.

(57) ABSTRACT

Embodiments of the present invention include a seat back pivotally coupled to a seat frame via a pivot shaft, wherein a lower end of the seat back does not extend below the pivot shaft, a seat pan fixedly coupled to the seat frame, at least one quadrant arm fixedly coupled to the seat back and pivotally coupled to the pivot shaft, and a recline lock coupled to the one quadrant arm and the seat frame. The pivot shaft is coupled to the seat frame at a high pivot location, wherein the seat back is configured to pivot adjacent a lumbar region of a passenger's back. The seat pan may optionally include an extension from the seat pan that is configured to couple to the pivot shaft and fill a seat back aperture located between the lower end of the seat back and the seat pan.

13 Claims, 9 Drawing Sheets

(56) References Cited

OTHER PUBLICATIONS

SICMA AERO SEAT Brochure "Worldwide closer to you . . . sit different . . . ," two pages (Oxygen product shown in brochure known to Applicants no later than Nov. 30, 2009).

Zodiac Aerospace Oxygen Presentation, 16 pages (Oxygen product shown in presentation known to Applicants no later than Nov. 30, 2009).

* cited by examiner

PASSENGER SEAT ASSEMBLY

CROSS REFERENCE TO RELATED APPLICATIONS

This application is related to and claims priority benefits from U.S. Provisional Application Ser. No. 61/283,230, filed on Dec. 1, 2009, entitled FIXED BOTTOM WITH LIMITED-RECLINE AIRCRAFT SEAT DESIGN. The '230 application is hereby incorporated in its entirety by this reference.

FIELD OF THE INVENTION

The field of the invention relates to passenger seats or the like.

BACKGROUND

Common carriers, such as passenger airlines, bus lines, and train lines, frequently convey substantial numbers of passengers simultaneously. In many instances, there is a desire to increase the number of seats within a given space to optimize the number of passengers being transported at any given time. By increasing the number of passenger seats in the space, the amount of space available for each passenger is diminished. The amount of available space is most noticeable by a passenger in the area between the passenger's knees and the passenger seat located forward of that passenger.

In order to provide as much room as possible for the passenger's knees in the diminished space, some passenger seats have been modified so that the seat backs do not recline. The reclining seat back has traditionally impeded into the passenger's knee space because seat backs traditionally pivot near the bottom seat cushion (as indicated by reference number 94 in FIG. 7). While this option may ensure that the passenger's knee space is preserved, the passenger's reclining comfort has been sacrificed. Thus, it is desirable to provide a passenger seat assembly that allows for provides as much space as possible for a passenger's knees, while still allowing the passenger some reclining comfort.

SUMMARY

Embodiments of the present invention include a seat back pivotally coupled to a seat frame via a pivot shaft, wherein a lower end of the seat back does not extend below the pivot shaft, a seat pan fixedly coupled to the seat frame, at least one quadrant arm fixedly coupled to the seat back and pivotally coupled to the pivot shaft, and a recline lock coupled to the one quadrant arm and the seat frame. The pivot shaft is coupled to the seat frame at a high pivot location, wherein the seat back is configured to pivot adjacent a lumbar region of a passenger's back. The seat pan may be configured to remain stationary when the seat back pivots relative to the pivot shaft.

In some embodiments, the recline lock may be centrally located adjacent an aft end of the seat pan. A strut assembly may be coupled to a second quadrant arm and the seat frame, where the strut assembly is configured to have the same stroke as the recline lock.

The seat pan may optionally include an extension from the seat pan that is configured to couple to the pivot shaft and fill a seat back aperture located between the lower end of the seat back and the seat pan.

DETAILED DESCRIPTION

Figure 1:
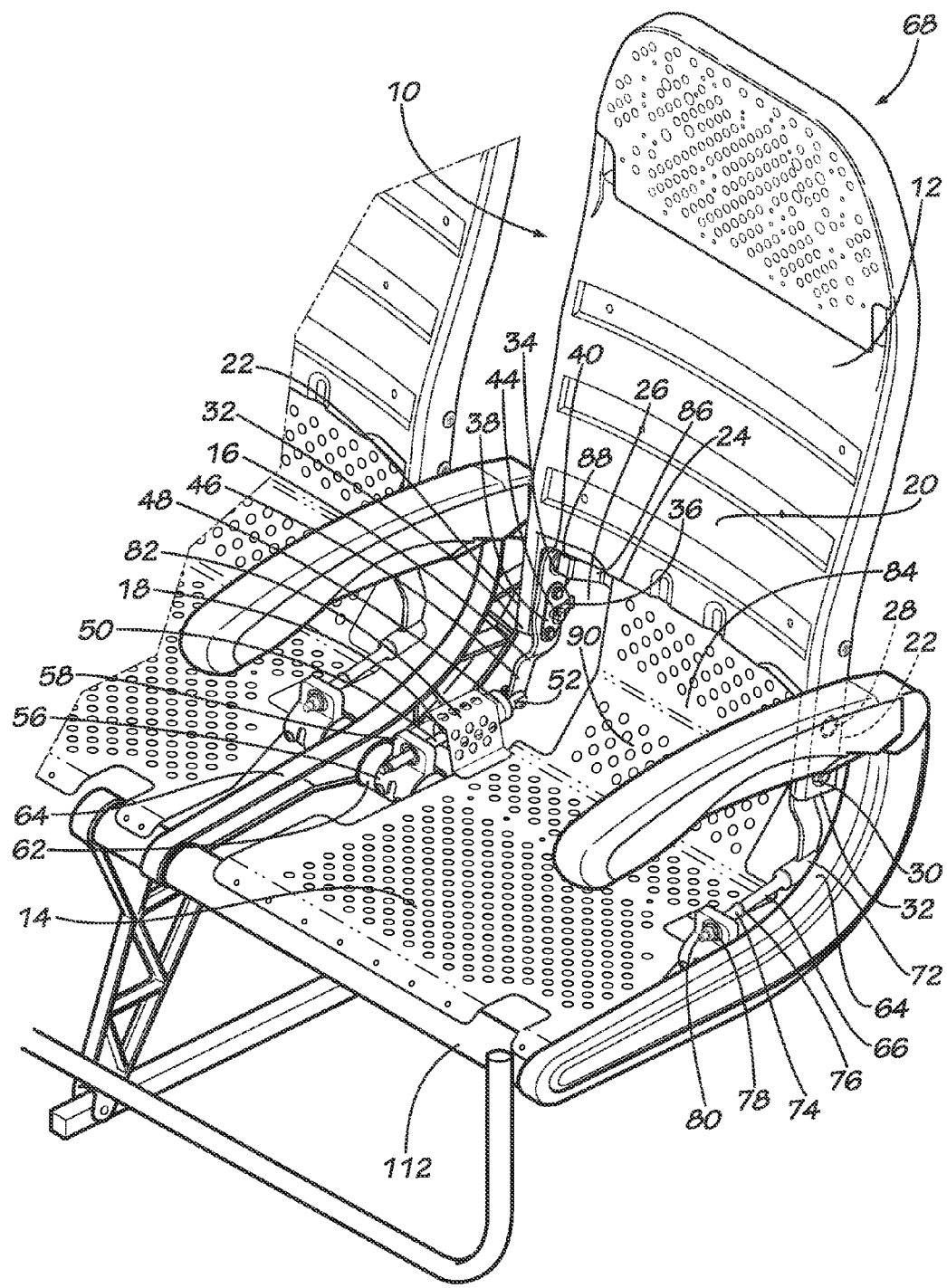
FIG. 1 is a front perspective view of a passenger seat assembly according to one embodiment of the present invention.

Embodiments of the invention provide passenger seat assemblies with a limited reclining back. While the passenger seat assemblies are discussed for use with aircraft seats, they are by no means so limited. Rather, embodiments of the passenger seat assemblies may be used in passenger seats or other seats of any type or otherwise as desired.

FIGS. 1-9 illustrate embodiments of a passenger seat assembly 10. The passenger seat assembly 10 comprises a seat back 12, a seat pan 14, at least one quadrant arm 16, and a recline lock 18.

The seat back 12 may be formed of materials including but not limited to aluminum, stainless steel, other metallic materials, composite materials, or other similar materials. In some embodiments, such as the embodiment shown in FIG. 1-7, the seat back 12 comprises a central panel 20 and at least one extension 22. The extension 22 is positioned at a lower end 24 of the central panel 20. The extension 22 may include an extension pivot aperture 28 and an aperture 30. The extension pivot aperture 28 is positioned on the extension 22 adjacent the lower end 24 of the central panel 20. The aperture 30 is positioned at a lower end 32 of the extension 22.

Figure 2:
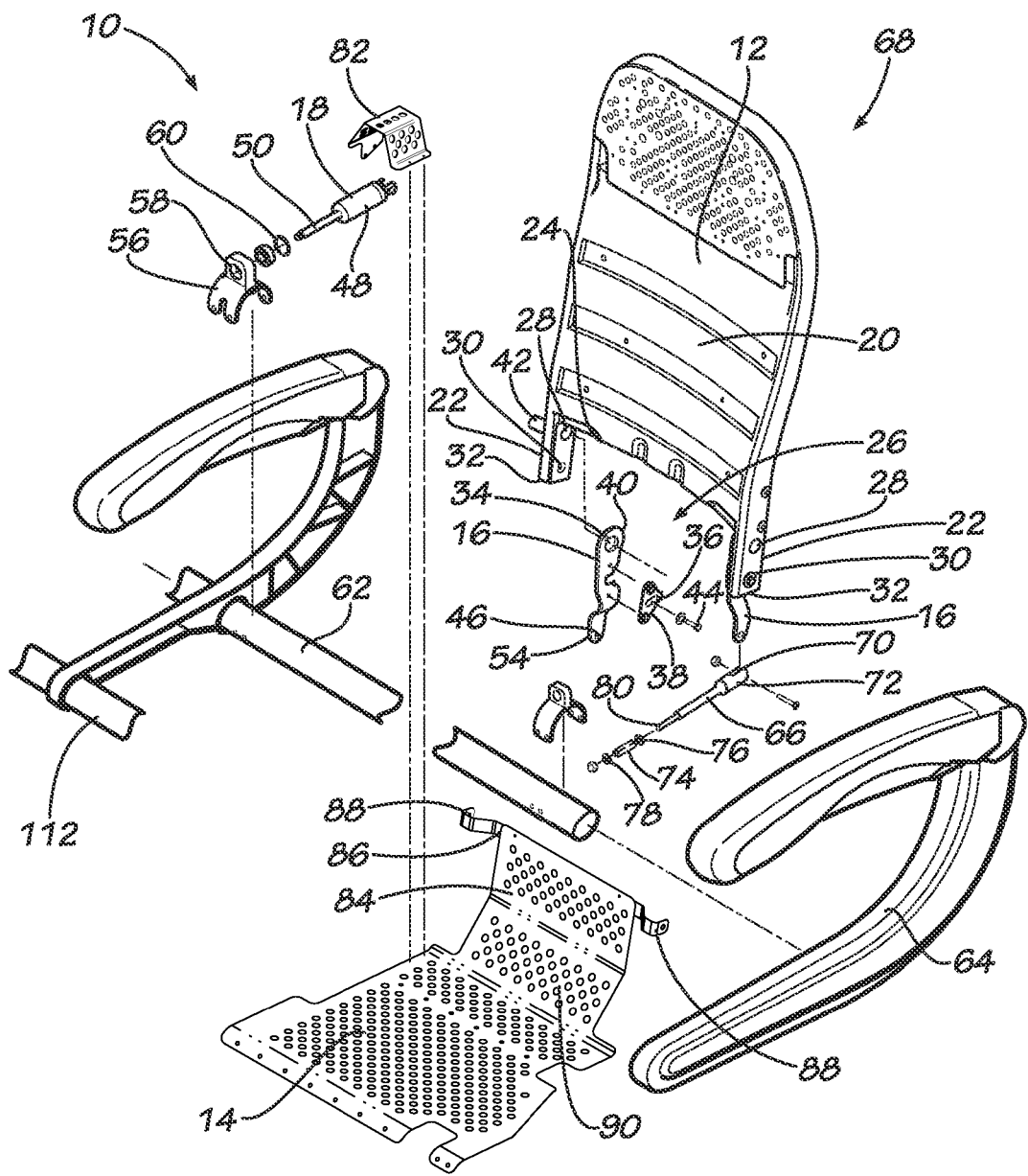
FIG. 2 is an exploded front perspective view of the passenger seat assembly of FIG. 1.
Figure 3:
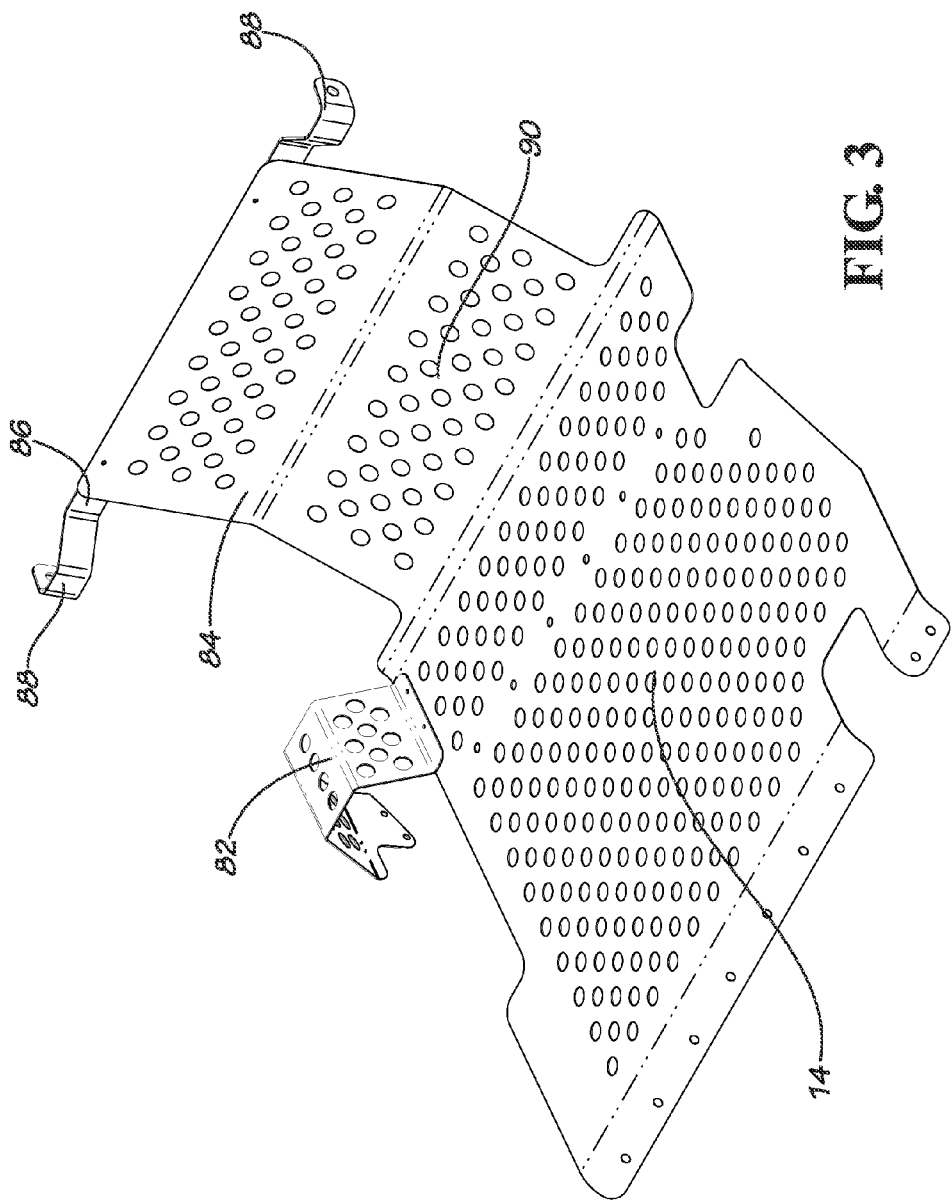
FIG. 3 is a front perspective view of a seat pan of the passenger seat assembly of FIG. 1.
Figure 6:
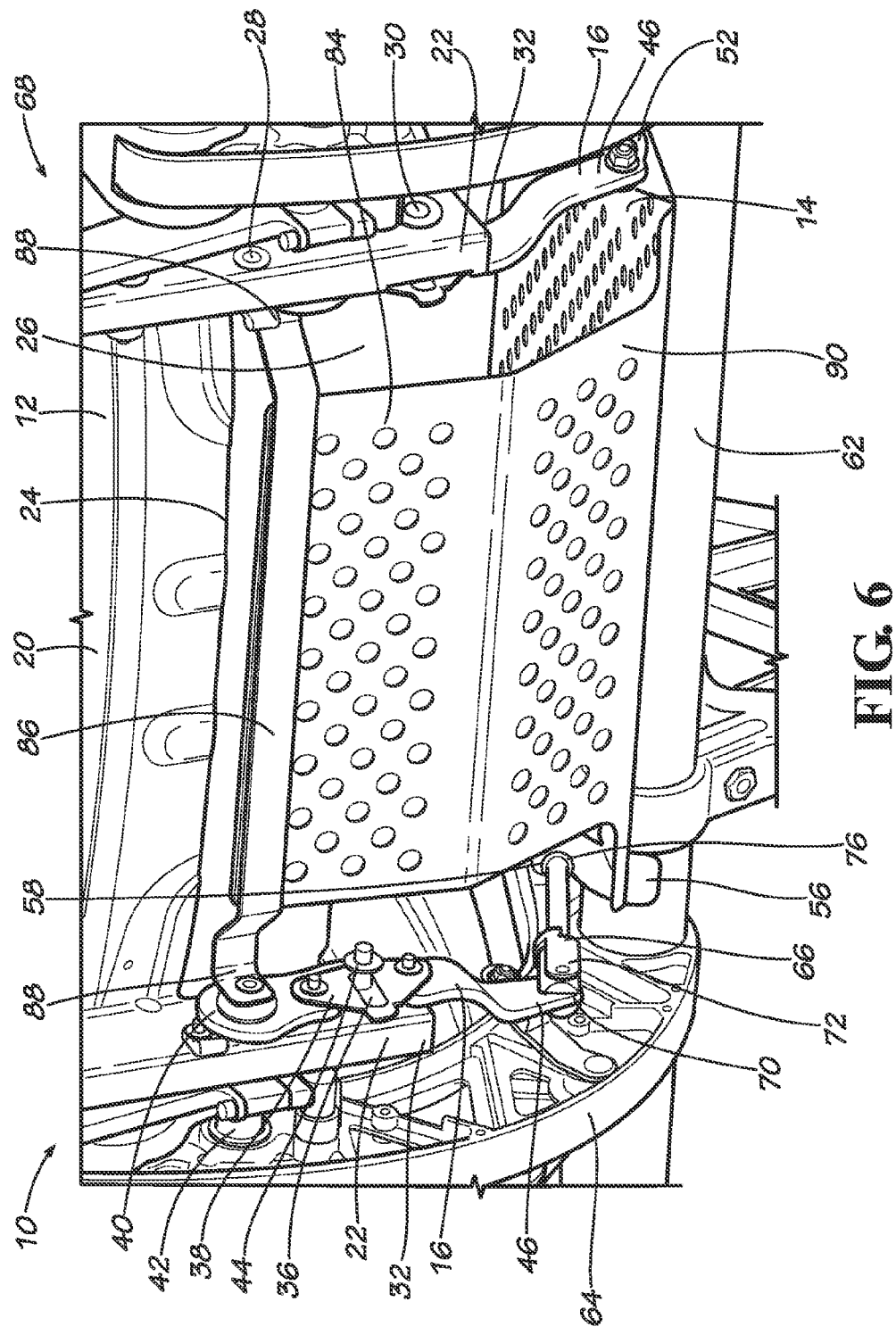
FIG. 6 is a rear perspective view of the passenger seat assembly of FIG. 1.
Figure 7:
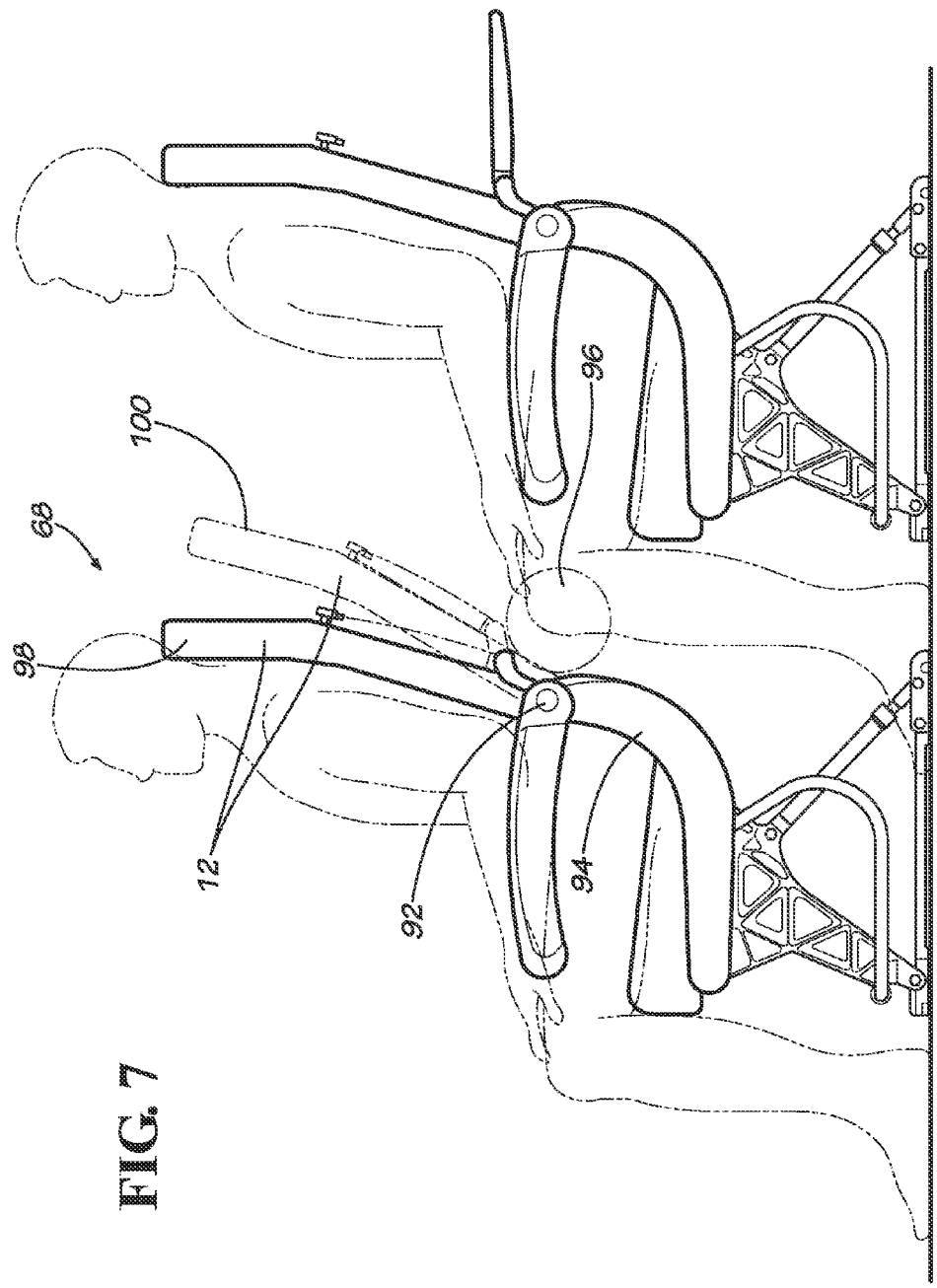
FIG. 7 is a side view of the passenger seat assembly of FIG. 1.

In some embodiments, such as the embodiment best shown in FIGS. 2 and 6, the extension pivot aperture 28 is configured to pivotally couple the seat back 12 to a pivot shaft 42. As illustrated in FIG. 7, the seat back 12 pivots relative to the pivot shaft 42 at a high pivot location 92. This high pivot location 92 is located above a traditional pivot location 94, where the traditional pivot location 94 is positioned closer to the seat pan 14. With the pivot shaft 42 located at the high pivot location 92, the seat back 12 is configured to pivot adjacent a lumbar region of a passenger's back, as opposed to the traditional pivot location adjacent a pelvic region of the passenger's back. If the high pivot location 92 were used in conjunction with a traditional seat back 12, a portion of the seat back 12 located below the high pivot location 92 would intrude into a passenger's back when the seat back 12 is reclined. To avoid this intrusion, the embodiment of the seat back 12 shown in FIGS. 1, 2, and 7 is configured so that the lower end 24 of the seat back 12 does not extend below the pivot shaft 42. As a result, a seat back aperture 26 is formed between the lower end 24 of the seat back 12 and the seat pan 14.

In some embodiments, such as the embodiment best illustrated in FIGS. 1-2, 4-6, and 8, the quadrant arm 16 is utilized to couple the seat back 12 to a seat frame 64. In this embodiment, the quadrant arm 16 is coupled to the extension 22. The quadrant arm 16 may be formed of materials including but not limited to aluminum, stainless steel, other metallic materials, composite materials, or other similar materials. In some embodiments, such as the embodiments shown in FIGS. 1-2, 4-6, and 8, the quadrant arm 16 has an angled shape as needed for the particular coupling arrangement between the seat back 12 and the seat frame 64. In other embodiments, the quadrant arm 16 may be substantially straight.

The quadrant arm 16 includes an arm pivot aperture 34 and a slot 36. In some embodiments, the slot 36 is formed in a bracket 38 that is coupled to the quadrant arm 16. In other embodiments, the slot 36 is integrally formed in the quadrant arm 16. The arm pivot aperture 34 is located in an upper end 40 of the quadrant arm 16 and positioned adjacent the extension pivot aperture 28 and the pivot shaft 42. Thus, in these embodiments, the quadrant arm 16 is also pivotally coupled to the pivot shaft 42 via the arm pivot aperture 34.

The slot 36 is located below the arm pivot aperture 34 and is positioned adjacent the aperture 30. A mechanical fastener 44 is inserted through the slot 36 and the aperture 30 to couple the quadrant arm 16 to the extension 22. The mechanical fastener 44 may be a screw, bolt, rivet, or other suitable mechanical fastening device. In this manner, the position of the seat back 12 relative to the arm quadrant 16 may be adjusted by sliding the mechanical fastener 44 to the appropriate location within the slot 36, then tightening the mechanical fastener 44 to prevent further movement of the mechanical fastener 44 relative to the slot 36. In other embodiments, the slot 36 may be an aperture that does not allow for adjustment of the position of the mechanical fastener 44.

In some embodiments, such as the embodiments best illustrated in FIGS. 1, 2, 4, and 8, a lower end 46 of the quadrant arm 16 is configured to couple to the recline lock 18. In these embodiments, the recline lock 18 is positioned adjacent an outward aft side of the seat pan 14. In other embodiments, the recline lock 18 may be centrally positioned aft of the seat pan 14. One of ordinary skill in the relevant art will understand that any suitable location for the recline lock 18 may be used. In these embodiments, the quadrant arm 16 and the extension 22 may be positioned in close proximity to the location of the recline lock 18.

In some embodiments, the quadrant arm 16 may be coupled to the lower end 24 of the seat back 12, where the seat back 12 does not include the extension 22. In other embodiments, the extension 22 may be elongated to couple to the recline lock 18 directly without the use of the quadrant arm 16. One of ordinary skill in the relevant art will understand that any suitable combination of the quadrant arm 16 and/or the extension 22 may be used to couple the seat back 12 to the recline lock 18.

The recline lock 18 may be a locking gas spring comprising a cylinder 48 and a piston 50. In these embodiments, a pivotal coupling 52 is positioned adjacent the cylinder 48. In the embodiments shown in FIGS. 1-9, the pivotal coupling 52 is configured to pivotally couple to the quadrant arm 16 via an aperture 54 located on the lower end 46 of the quadrant arm 16. In other embodiments, the pivotal coupling 52 may be configured to pivotally couple directly to the extension 22.

Figure 4:
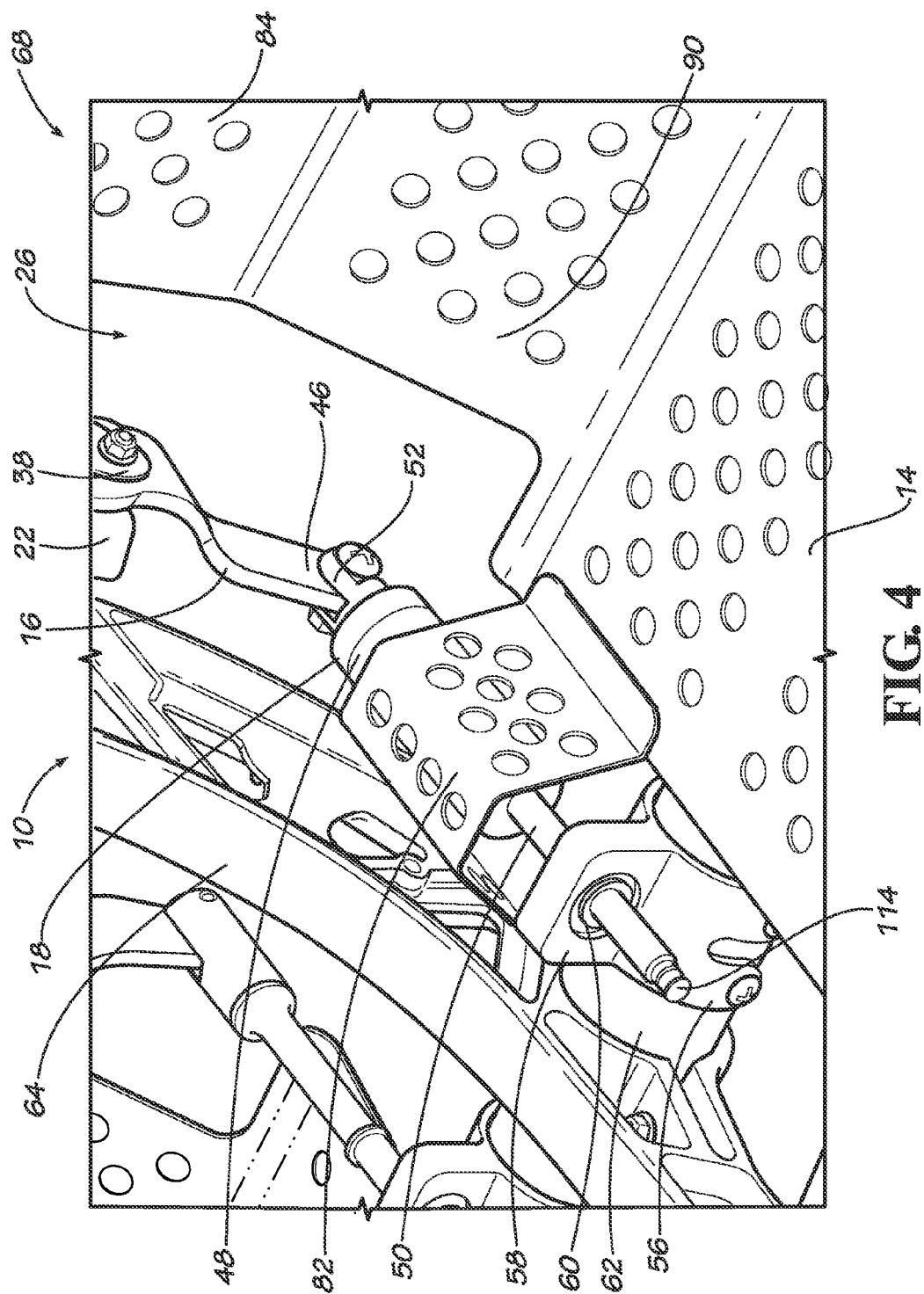
FIG. 4 is a partial front perspective view of the passenger seat assembly of FIG. 1.

In some embodiments, such as the embodiment best illustrated in FIGS. 1, 2, and 4, the piston 50 is coupled to a bracket 56 via a receptacle 58. In this embodiment, a spherical plane bearing 60 is used to couple the piston 50 to the receptacle 58. The spherical plane bearing 60 allows the piston 50 to rotate in all directions relative to the receptacle 58, but prevents the piston 50 from sliding forward or aft relative to the bracket 56. This type of coupling between the piston 50 and the bracket 56 prevents a bending force from being applied to the recline lock 18. The bracket 56 is in turn coupled to an aft base frame tube 62 of the seat frame 64.

Figure 8:
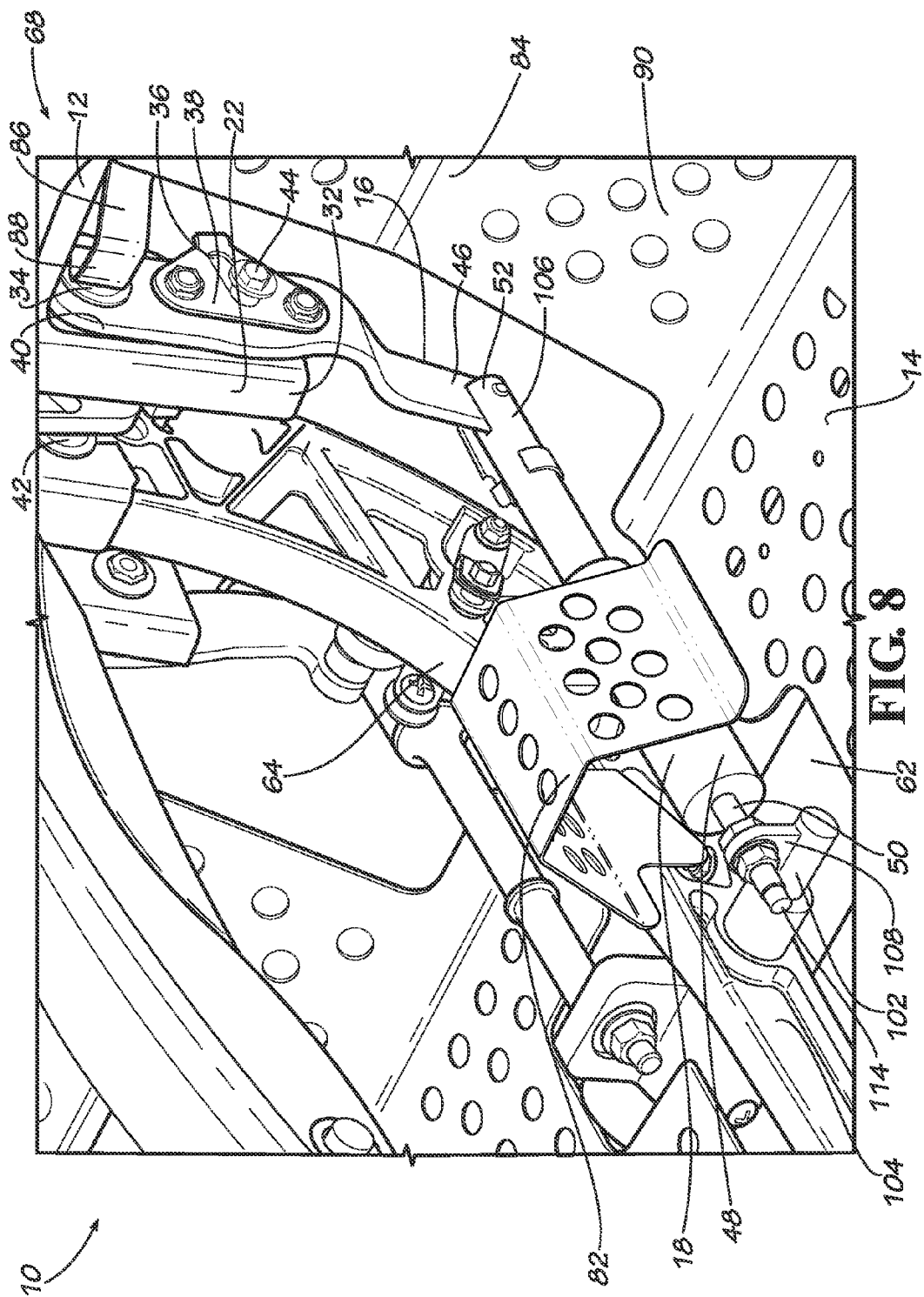
FIG. 8 is partial front perspective view of a passenger seat assembly according to an alternative embodiment of the present invention.
Figure 9:
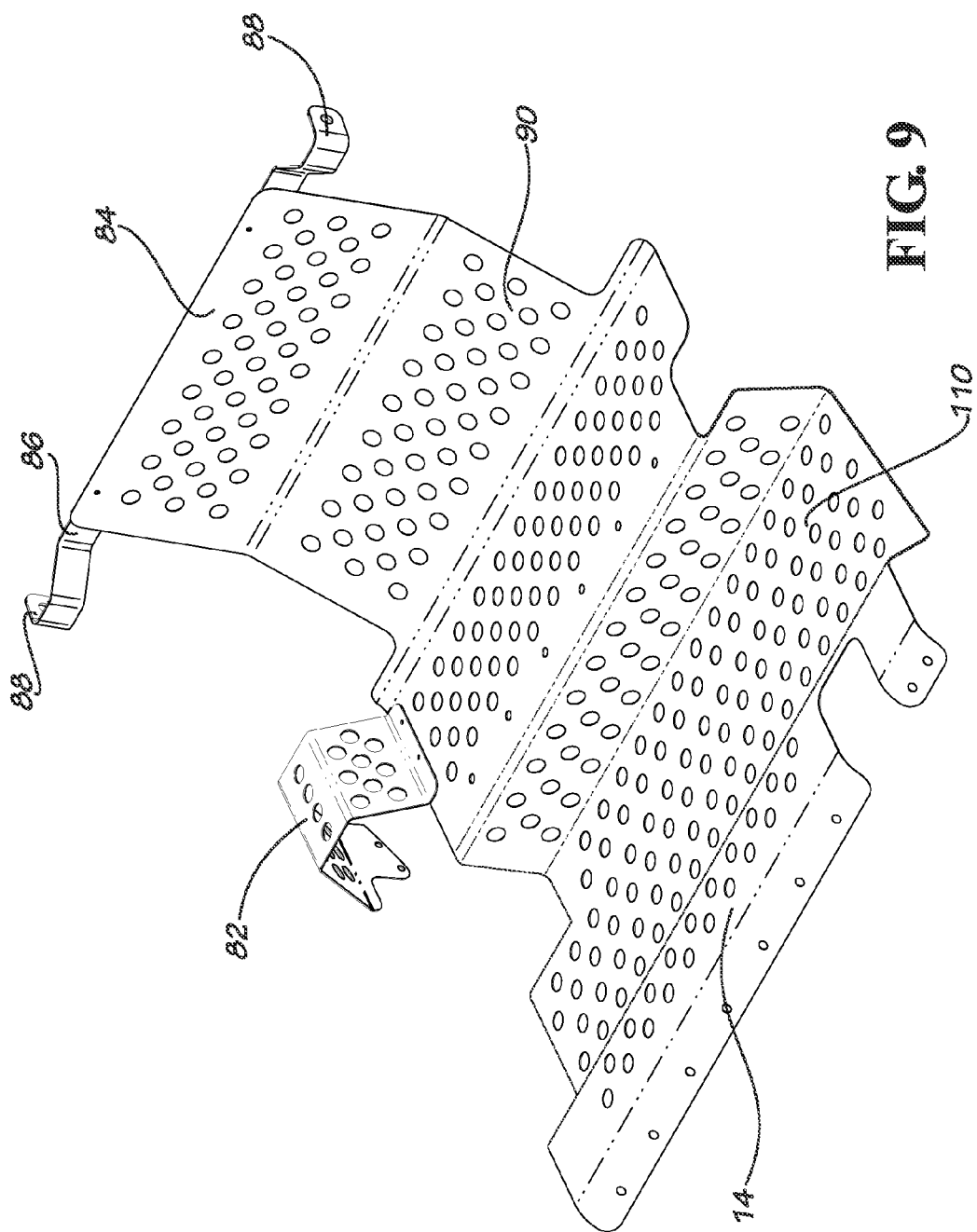
FIG. 9 is a front perspective view of a seat pan of a passenger seat assembly according to an alternative embodiment of the present invention.

In other embodiments, such as the embodiment best illustrated in FIG. 8, the recline lock 18 may be coupled directly to a spreader 104 through the use of a trunnion 102. In this embodiment, the piston 50 is coupled to the trunnion 102 via a receptacle 108. However, in this embodiment, the spherical plane bearing 60 is not used to couple the piston 50 to the receptacle 108. Instead, the trunnion 102 serves a similar purpose of preventing a bending force from being applied to the recline lock 18, thus eliminating the need for the spherical plane bearing 60. In this embodiment, the trunnion 102 is located forward of the aft base frame tube 62, thus moving the location of the recline lock 18 forward. As a result, a strut 106 is coupled to the cylinder 48, where the strut 106 includes the pivotal coupling 52 that is configured to pivotally couple the recline lock 18 to the aperture 54 located on the lower end 46 of the quadrant arm 16.

A strut assembly 66 may be used to limit deflection of the seat back 12 in some embodiments, depending on the composition and torsion resistance of the seat back 12. The amount of torsion resistance of the seat back 12 is measured in a Head-Impact-Criteria (HIC) test that uses an anthropometric test dummy (ATD) in a 16 g test crash of passenger seats 68 in series. When the ATD hits one of the passenger seats 68, the seat back 12 may twist in some instances when the seat back 12 is fixed on one side (i.e., where the seat back 12 is coupled to the recline lock 18).

In the embodiments where the recline lock 18 is centrally located relative to the seat pan 14, the use of a strut assembly 66 may be unnecessary or two strut assemblies 66 may be needed on either side of the recline lock 18, depending on the composition and torsion resistance of the seat back 12. One of ordinary skill in the relevant art will understand that any suitable location and number of the strut assemblies 66 may be used. In other embodiments, a stiffer material may be used to form the seat back 12 or a torsion tube may be used so that the strut assembly 66 is not required.

In some embodiments where the strut assembly 66 is used, such as the embodiment best illustrated in FIGS. 1, 2, 5, and 6, another quadrant arm 16 and/or another extension 22 may be included to couple the seat back 12 to the strut assembly 66. One of ordinary skill in the relevant art will understand that the total number of the additional quadrant arms 16 and/or additional extensions 22 used, as well as their position, may depend on the number of the strut assemblies 66 used and their positions.

In the embodiments where one strut assembly 66 is used and the recline lock 18 is positioned adjacent the outward aft side of the seat pan 14, the strut assembly 66 is positioned adjacent an inward aft side of the seat pan 14. The strut assembly 66 may be formed of materials including but not limited to aluminum, stainless steel, other metallic materials, composite materials, or other similar materials. In this embodiment, the strut assembly 66 comprises a pivotal coupling 70 that is positioned adjacent an aft end 72 of the strut assembly 66 and configured to pivotally couple to the quadrant arm 16 via the aperture 54 located on the lower end 46 of the quadrant arm 16. In other embodiments, the pivotal coupling 70 may be configured to pivotally couple directly to the extension 22.

Figure 5:
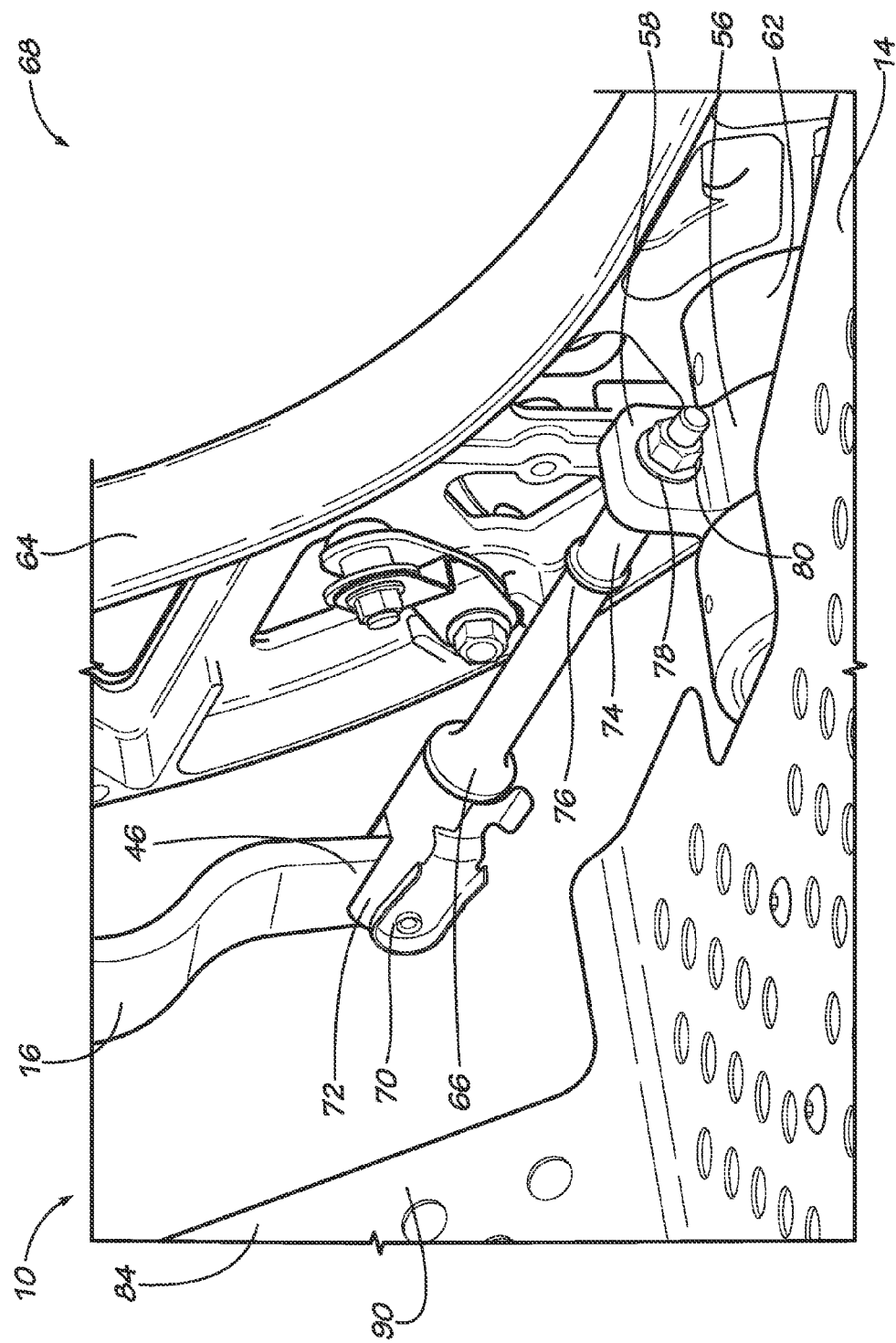
FIG. 5 is a partial front perspective view of the passenger seat assembly of FIG. 1.

In some embodiments, such as the embodiment best illustrated in FIG. 5, the strut assembly 66 also comprises a sliding region 74 that is coupled to a second bracket 56. The sliding region 74 is located forward and adjacent an aft stop 76 that is positioned along the strut assembly 66. The sliding region 74 is inserted through the receptacle 58 of the bracket 56 and a forward stop 78 is coupled to an end 80 of the strut assembly 66. However, in this embodiment, a spherical plane bearing is not used to couple the sliding region 74 to the receptacle 58. Instead, the sliding region 74 is configured to move forward and aft relative to the bracket 56 within the confines of the stops 76, 78. The bracket 56 is in turn coupled to the aft base frame tube 62 of the seat frame 64. In other embodiments, the strut assembly 66 may be coupled directly to the spreader 104 through the use of the trunnion 102.

The strut assembly 66 is configured to have the exact stroke as the recline lock 18. For example, the location of the aft stop 76 is set to coincide with the maximum amount of recline in the passenger seat 68, and the location of the forward stop 78 is set to coincide with the fully upright position of the passenger seat 68. Thus, when the seat back 12 is reclined, the strut assembly 66 and the recline lock 18 stop simultaneously, thus providing a rigid support for a fully upright position 98 and a fully reclined position 100 of the passenger seat assembly 10, as shown in FIG. 7.

The seat pan 14 is coupled to the seat frame 64. The seat pan 14 may be formed of materials including but not limited to aluminum, stainless steel, other metallic materials, composite materials, or other similar materials. In some embodiments, such as the embodiment shown in FIGS. 1-6, the seat pan 14 has a substantially planar shape that spans across the surfaces of the aft base frame tube 62 and a forward base frame tube 112.

In some embodiments, a cushion that is placed over the seat pan 14 is required to also serve as a flotation device. In these embodiments, the cushion must include some amount of flotation material. Typically, the flotation material is a less comfortable seating surface for the passenger than other types of cushion material. Examples of suitable flotation materials include but are not limited to closed-cell foams and flotation foams. Thus, it may be desirable to use the flotation material in combination with more comfortable cushion material, where the cushion material predominantly contacts the passenger seated in the passenger seat 68. Examples of suitable cushion materials include but are not limited to open-cell foams and comfort foams. In order to provide an isolated location for the flotation material, some embodiments of the seat pan 14, such as the embodiment illustrated in FIG. 9, may include a recessed area 110 that is configured to fit within the space between the forward base frame tube 112 and the aft base frame tube 62. The recessed area 110 provides a space to include the necessary amount of flotation material to ensure proper cushion flotation, while allowing the more comfortable cushion material above the seat pan 14 to contact the passenger.

In some embodiments, the seat pan 14 includes a cover 82 that is shaped to substantially enclose at least a portion of the recline lock 18. The cover 82 prevents application of a lateral load to the piston 50 of the recline lock 18, which could damage the operation of the recline lock 18.

In some embodiments, such as the embodiments shown in FIGS. 1-9, the seat pan 14 may optionally include an extension 84 that is configured to extend upward into the seat back aperture 26. In these embodiments, the extension 84 is shaped to meet the lower end 24 of the seat back 12 adjacent the high pivot location 92. As a result, the extension 84 is configured to fill the seat back aperture 26 located between the lower end 24 of the seat back 12 and the seat pan 14, thus providing a smooth transition from the seat back 12 to the seat pan 14 so that the passenger's back is supported throughout the transition between these components. The extension 84 also protects the passenger seated in the passenger seat 68 from direct contact by a passenger located aft of the seat back 12.

The extension 84 is coupled to the seat back 12 and the pivot shaft 42 via a bracket attachment 86. By coupling the extension 84 to the pivot shaft 42 instead of the seat back 12, the extension 84 (and thus the seat pan 14) remains stationary when the seat back 12 reclines. The bracket attachment 86 includes ends 88. Each end 88 is coupled to the seat back 12 adjacent and interior to the coupling location of the arm pivot aperture 34 and the extension pivot aperture 28. In other embodiments where it is desirable to have the weight of the passenger seat assembly 10 as low as possible, the extension 84 may not be included and the seat back aperture 26 may be covered by a fabric or other suitable lightweight material.

In some embodiments, such as the embodiments shown in FIGS. 1-9, the extension 84 may also include a transitional section 90 that couples the extension 84 to the seat pan 14. In some embodiments, the transitional section 90 is shaped to provide an angled transition between the extension 84 and the seat pan 14, thus providing additional space adjacent a knee space region 96 of a passenger located aft of the seat back 12, as shown in FIG. 7. In this embodiment, the transitional section 90 provides additional knee room for the passenger without impacting the comfort of the passenger seated in the passenger seat 68.

The cover 82, the extension 84, and the transitional section 90 may be formed of materials including but not limited to aluminum, stainless steel, other metallic materials, composite materials, or other similar materials. For example, each of these components may be formed of the same material used to form the seat pan 14 or may be formed of different materials. In some embodiments, the extension 84, the transitional section 90, and the seat pan 14 may be integrally formed. In other embodiments, the extension 84, the transitional section 90, the seat pan 14, and the cover 82 may be integrally formed.

Furthermore, as shown in FIG. 7, by locating the pivot shaft 42 in the high pivot location 92, as opposed to the traditional pivot location 94, the seat back 12 provides additional comfort to the passenger seated in the passenger seat 68 by allowing some recline from a fully upright position without impeding the knee space region 96 of the passenger located aft of the seat back 12. In the embodiments where the seat pan 14 remains stationary when the seat back 12 reclines, such as the embodiment best illustrated in FIG. 7, there is no reduction of the knee space region 96 when the seat back 12 is reclined.

To recline the passenger seat assembly 10, the passenger actuates the recline lock 18 by pulling a lever or pushing a button that is coupled to a plunger 114 extending from an external end of the piston 50. Actuation of the lever or button depresses the plunger 114, causing a valve inside the piston 50 to open. When the valve is opened, a fluid or gas within the cylinder 48 is able to pass from one side of the piston 50 to the other side and the piston 50 is thus able to move within the cylinder 48. When the plunger 114 is released, the valve inside the piston 50 closes so that fluid or gas can no longer pass from one side of the piston 50 to the other side, thus locking the piston 50 in that position.

When the recline lock 18 is actuated, as shown in FIG. 7, the seat back 12 rotates to any desired recline position between the fully upright position 98 and the fully reclined position 100. In some embodiments, the fully reclined position 100 is less than 30 degrees relative to a vertical axis. However, one of ordinary skill in the relevant art will understand that the fully reclined position 100 may have any suitable angle relative to the vertical axis as desired.

The foregoing is provided for purposes of illustrating, explaining, and describing embodiments of the present inven- That which is claimed is:

1. A passenger seat assembly comprising:
   (a) a seat frame comprising a pair of vertical supports, wherein a high pivot location is positioned proximate an upper end of each vertical support;
   (b) a seat back comprising a central panel having a lower end and a pair of extensions that are configured to project downwardly from the lower end, wherein each extension is pivotally coupled to the high pivot location of each vertical support;
   (c) a seat pan fixedly coupled to the seat frame;
   (d) a recline lock having a first end coupled to the seat frame via a trunnion and having a second end coupled to one extension of the pair of extensions via a quadrant arm; and
   (e) a strut assembly having a first end coupled to the seat frame and having a second end coupled to a second extension of the pair of extensions via a second quadrant arm;
   wherein the seat back is configured to pivot proximate a lumbar region of a passenger's back when the passenger is seated in the passenger seat assembly.

2. The passenger seat assembly of claim 1, wherein the seat pan further comprises an extension from the seat pan that is configured to couple to a pivot shaft positioned proximate the high pivot location and substantially fill a seat back aperture located between the lower end of the central panel and the seat pan.

3. The passenger seat assembly of claim 1, wherein the seat pan is configured to remain stationary when the seat back pivots relative to the high pivot location.

4. The passenger seat assembly of claim 1, wherein the recline lock is centrally located adjacent an aft end of the seat pan.

5. The passenger seat assembly of claim 1, wherein the strut assembly is configured to have the same stroke as the recline lock.

6. The passenger seat assembly of claim 1, wherein the seat pan further comprises a recessed area that is positioned between a forward base frame tube and an aft base frame tube.

7. A passenger seat assembly comprising:
   (a) a seat frame comprising a pair of vertical supports, wherein a high pivot location is positioned proximate an upper end of each vertical support;
   (b) a seat back comprising a central panel having a lower end and a pair of extensions that are configured to project downwardly from the lower end, wherein each extension is pivotally coupled to the high pivot location of each vertical support;
   (c) a seat pan fixedly coupled to the seat frame;
   (d) a pair of quadrant arms, wherein each quadrant arm is fixedly coupled to each extension;
   (e) a recline lock having a first end coupled to the seat frame via a trunnion and having a second end coupled to one quadrant arm of the pair of quadrant arms, and
   (f) a strut assembly having a first end coupled to the seat frame and having a second end coupled to a second quadrant arm of the pair of quadrant arms;
   wherein the seat back is configured to pivot proximate a lumbar region of a passenger's back when the passenger is seated in the passenger seat assembly.

8. The passenger seat assembly of claim 7, wherein the strut assembly is configured to have the same stroke as the recline lock.

9. A method of reclining a passenger seat assembly, the passenger seat assembly comprising a seat frame comprising a pair of vertical supports, wherein a high pivot location is positioned proximate an upper end of each vertical support, a seat back comprising a central panel having a lower end and a pair of extensions that are configured to project downwardly from the lower end, wherein each extension is pivotally coupled to the high pivot location of each vertical support, a seat pan fixedly coupled to the seat frame, a pair of quadrant arms, each quadrant arm fixedly coupled to each extension, a recline lock coupled to one of the pair of quadrant arms and to the seat frame, and a strut assembly is coupled to a second one of the pair of quadrant arms and to the seat frame, the steps comprising:
   (a) actuating the recline lock;
   (b) pivoting the seat back relative to the seat frame to a desired recline position, wherein the seat back pivots proximate a lumbar region of a passenger's back when the passenger is seated in the passenger seat assembly; and
   (c) releasing the recline lock to secure the seat back in the desired recline position.

10. The method of claim 9, wherein pivoting the seat back comprises the recline lock transitioning a position of the quadrant arm to the desired recline position and pivoting the seat back relative to the high pivot location.

11. The method of claim 9, wherein the seat pan further comprises an extension from the seat pan that is configured to couple to a pivot shaft positioned proximate the high pivot location and substantially fill a seat back aperture located between the lower end of the central panel and the seat pan.

12. The method of claim 9, wherein the seat pan remains stationary while the seat back pivots relative to the high pivot location.

13. The method of claim 9, wherein the strut assembly is configured to have the same stroke as the recline lock.

\* \* \* \* \*